Figure 1:
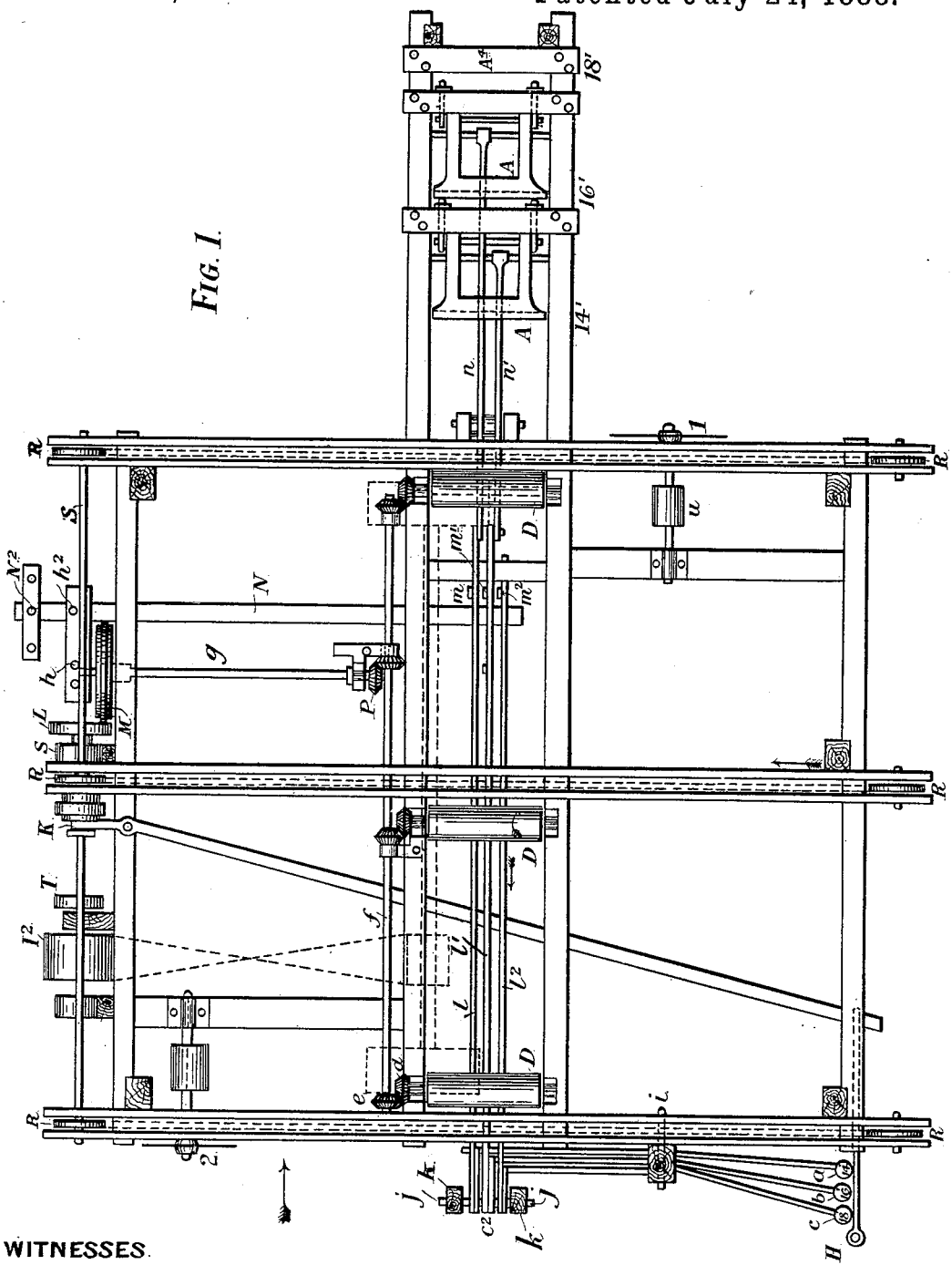

(No Model.)  2 Sheets—Sheet 1.

M. GARLAND.
LUMBER TRIMMER.

No. 386,701. Patented July 24, 1888.

WITNESSES.
M. J. Jaretzky
C. Finkelmeier

INVENTOR
Michael Garland,
By J. N. McIntire.
Attorney.

(No Model.) 2 Sheets—Sheet 2.

M. GARLAND.
LUMBER TRIMMER.

No. 386,701. Patented July 24, 1888.

WITNESSES
M. J. Jaretzky
C. Pinkelmeier

INVENTOR,
Michael Garland,
By J. N. McIntire,
Attorney.

UNITED STATES PATENT OFFICE.

MICHAEL GARLAND, OF BAY CITY, MICHIGAN.

LUMBER-TRIMMER.

SPECIFICATION forming part of Letters Patent No. 386,701, dated July 24, 1888.

Application filed September 17, 1887. Serial No. 249,926. (No model.)

*To all whom it may concern:*

Be it known that I, MICHAEL GARLAND, of Bay City, in the county of Bay and State of Michigan, have invented a new and useful Improvement in Live-Roll Movement for Trimmers; and I do hereby declare that the following is a full, clear, and exact description thereof, reference being had to the accompanying drawings, making part of this specification.

My invention relates to lumber-trimmers or that kind of sawing machinery which is adapted to trim or cut off the ends of boards to remove the superfluous and imperfect portions and produce boards of uniform length, generally varying about two feet, and making what is known to the trade as 12, 14, 16, and 18 foot lumber.

As is well known to those skilled in the art, the machines for performing this trimming operation are usually made and operate in such manner that after a board of any length shall have been properly placed on the carrier-chains of the machine by two operatives (one standing at either end of the front of the machine) the board will be carried along and have one end cut off by the usual circular saw, and on arrival at the vicinity of the middle of the top frame of the machine will be fed by said chains immediately over a series of idler-rolls having their axes located in lines coincident with the path of travel of the board, whereupon another operative, standing at one side of the machine, will push the board endwise along on top of said rolls until its trimmed edge shall be forced up against a stop, arranged to predetermine the length which the trimmed board shall have, after which hand operation the carrier-chains will continue to feed the board (widthwise) along over the top frame of the trimmer until the board shall have arrived at the vicinity of the second circular saw, (located on the side opposite to that where the first saw is located,) by means of which latter saw the other end of the board will be trimmed, the machine then discharging the trimmed board, which will be of a length about equal to the distance between the plane in which the last saw moves, and that in which is located the face of the stop against which the board was pushed by the third operator, just above alluded to. In machines as thus heretofore constructed and operating not only is the time, labor, and expense of a third operator or operative necessary to the trimming of the boards of different lengths on the same machine, but in the operation of the machine the boards, being pushed by hand against the stop in the usual manner, will in practice recoil or rebound slightly, (the operation having to be performed quickly while the boards are traveling along laterally,) the result of which is that the trimmed lumber varies in length, the boards, instead of being all exactly the same length, being frequently from a half inch to an inch and a half shorter or longer than each other.

I propose by my invention or improvement in machines for trimming lumber to not only effectually overcome this difficulty and avoid the irregularity in the length of the boards, but also to provide for use a machine in which, besides having greater perfection of operation, the third operator or operative heretofore necessary for the purpose above alluded to may be wholly dispensed with, the machine automatically performing the operation of feeding the boards endwise against the stop at the pleasure of one of the two operatives who assists in placing the boards on the front end of the trimmer-table; and to this main end and object my invention may be said to consist, essentially, in the combination, with the longitudinally-arranged rolls upon which the boards travel in being forced endwise (whenever occasion may require) toward and against the usual stops, of suitable means for imparting the proper rotatory motion to said rolls to make them operate as "live" rolls to feed the boards endwise, the said means for operating said rolls possessing the capacity of being thrown into and out of gear at the pleasure of one of the operatives at the front of the machine through the medium of suitable devices under the control of the operative, all as will be hereinafter more fully explained, and as will be more particularly pointed out, and specifically defined in the claims of this specification.

To enable those skilled in the art to which my improvement relates to make and use trimmers embracing my invention, I will now proceed to more fully describe the latter, referring by letters to the accompanying drawings, which form part of this specification, and in which I have represented my invention as applied to one of the known forms of machines for trimming lumber.

Figure 2:
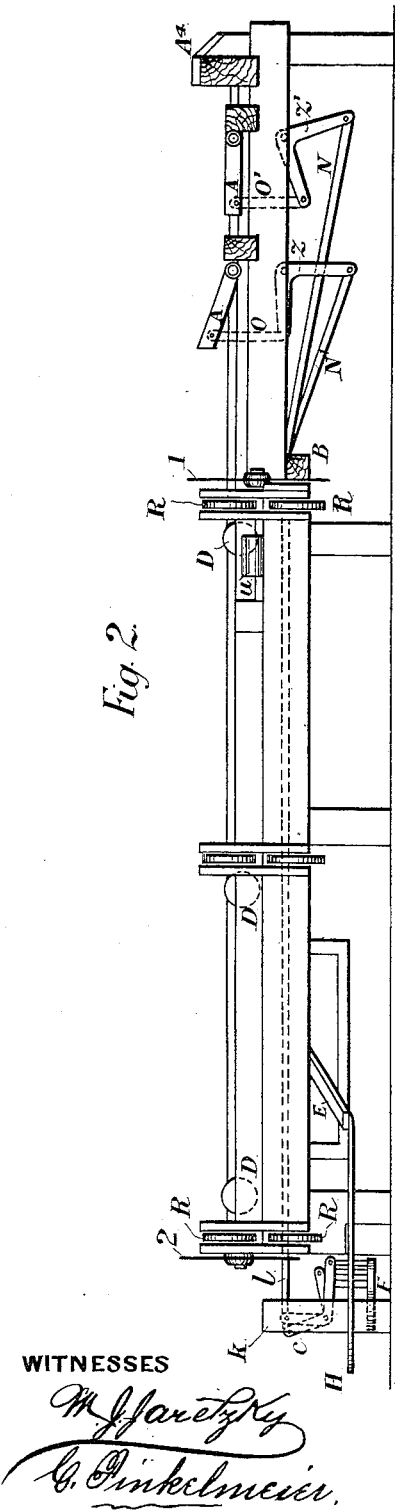
Figure 3:
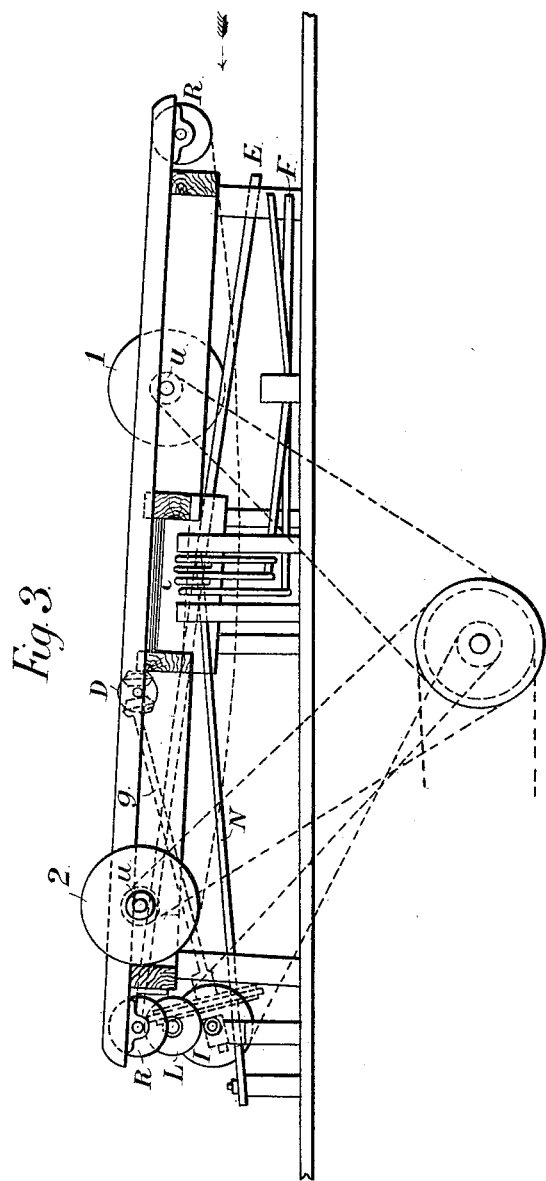

In the drawings, Figure 1 is a plan or top view of a trimmer involving my improvement or invention. Fig. 2 is a rear or back view of the same, and Fig. 3 is a side elevation looking at that side of the machine at which it has heretofore been customary for the third operative to stand for the purpose of pushing the boards endwise in trimming lumber of different lengths.

In the several figures the same parts will be found designated by the same letters of reference.

The general construction and mode of operation of the trimmer, with the exception of the devices which I have added for rendering the usual dead rolls operative as feed-rolls at the pleasure of one of the operatives who places the boards on the front of the machine-table, and the devices for enabling him to also operate the adjustable stops at pleasure, being old and well understood by those skilled in the art, it would seem to be only necessary in this specification to describe the novel appliances which I have added to the machine for the purpose of carrying out the objects of my invention.

Each one of the usual rolls, D, of the trimmer is provided at one end, as shown, with a beveled pinion, $d$, which engages with one of a series of similar pinions, $e$, made fast on a shaft, $f$, which is mounted to turn freely in suitable bearings, and is arranged, as shown, transversely to the axes of the said rolls D. With one of the pinions $d$ of said transverse shaft $f$ engages a driving gear or pinion, P, which is keyed fast on the forward end of a shaft, $g$, which runs in a direction transverse to the line of the shaft $f$, and the rear end of which is mounted in a suitable bearing or box within a sliding frame, $h$, at the rear end of the main frame of the trimmer. This shaft $g$ carries near its rear end a friction pulley or wheel, M, which is adapted to be thrown into and out of contact at its periphery with the side of a driving friction-pulley, L, that is mounted on the counter-shaft S, which drives or operates the rear set of sprocket-wheels, R, of the carrier-chains of the trimmer, and said friction-wheel M is thrown into and out of contact with said friction driving-pulley at the pleasure of one of the operatives at the front of the machine by means which I will now describe.

$a\ b\ c$ are respectively duplicate pedals or foot-levers, the pedal ends of which are located so as to be within convenient reach of the operator who stands at the left-hand front corner of the machine, and which are pivoted, as shown at $i$, near their middle portions, and have their free ends connected, respectively, to a series of bell-cranks or angle-levers, $c^2$, which in turn are pivoted at $j$ to posts or standards $k$, all as clearly shown in the drawings.

From the upper ends of these bell-cranks $c^2$ extend crosswise of the trimmer, at the vicinity of its middle portion, connecting rods or bars $l\ l'\ l^2$, on which bars there are lug-like projections or catches $m\ m'\ m^2$, all as best seen at Fig. 1.

N is a vibratory bar or lever, which has a stationary fulcrum at $N^2$, as shown, and which, by means of a pivotal connection at $h^2$, operates, when moved back and forth slightly at its forward end, to actuate the sliding frame $h$, which carries the rear journal box or bearing of the shaft $g$.

Now, through the media just referred to, the operator, standing at the left-hand front corner of the machine, by pressing down, as may be required, one or the other of the three pedals $a\ b\ c$ will thereby cause one or the other of the connecting rods or bars $l\ l'\ l^2$ to be pulled or drawn in the direction indicated by the arrow at Fig. 1, whereby one of the lugs or catches $m\ m'\ m^2$ will be forced against the outer end of the vibratory arm or lever N, and will then force or move said end of said lever in the direction in which the connecting-rod is pulled and to a sufficient extent to cause the necessary movement of the sliding frame $h$ to force the periphery of the friction-wheel M on the rear end of shaft $g$ sufficiently into contact with the driving friction-wheel L to cause the latter to effectually drive said wheel M, and, through the medium of its shaft $g$, the gear-wheel P, and the pinions $d$ and $e$, to impart the necessary motion to the rolls D to cause them to automatically and properly feed any board which may be resting upon them endwise toward and against such one of the stops A of the trimmer as may be properly set for stopping the end of the board. Two of the same connecting-rods, $l$ and $l'$, which are used for the purpose just described, are provided with extensions $n$ and $n'$, (see Figs. 1 and 2,) which are respectively connected with the lower ends of two bell-cranks, Z Z', which are pivoted at their angles in the laterally-projecting framework of the trimmer, and which have coupled to their other ends the links $o$, which are employed to elevate and depress the hinged stops A in a manner well understood; hence by the manipulation of the pedals $a\ b$ whenever occasion may require (for the purpose of actuating the lever N to set the rolls D in motion) these hinged stops for predetermining the length of the board to be trimmed are at the same time thrown into an operative condition. In other words, whenever a board is placed on the trimmer by the two operatives located at each of the front corners of the front of the machine that is long enough to make a good fourteen-foot board, the board is placed on so as to be carried along and have its right-hand end trimmed or cut off by the usual saw at $l$, and when the board shall have arrived at the vicinity of and immediately over the rolls D the operator at the left-hand front corner of the machine presses down the pedal $a$, whereby one of the bell-cranks $c^2$ is made to manipulate the connecting-rod $l'$ and its extension $n'$ in the proper manner to throw down the stop A, that predetermines the length of a fourteen-foot board, and at the same time to bring the lug or catch $m'$ into contact with the free end of the lever N and throw the driving mechanism into motion for giving the proper feed to the rolls D to feed the board endwise until its trimmed end shall be brought up to and continuously held against the stop A, so that the board when subsequently fed laterally toward the rear of the trimmer (and after the releasement of pedal $a$) will be brought to the saw 2 in a proper position to have its other end cut parallel with and exactly fourteen feet from the end previously trimmed.

That one of the connecting rods which is marked $l^2$ is designed to bring the driving mechanism into operation for rotating the feed-rolls D only when an eighteen-foot board is to be trimmed, and hence this connecting-bar, while adapted like the others to move the free end of the lever N, has no extension to operate any movable stop, because the stop $A^4$ (for the eighteen-foot board) is, as usual, a permanent or stationary stop.

From the foregoing description, read in connection with the drawings, those familiar with the construction and operation of "trimmers" may easily understand how to apply to and operate in conjunction with such machine my invention or improvement.

Of course it will be understood that some other means for effecting the proper motion of the rolls D at the proper time at the pleasure of one of the operatives at the front of the machine may be devised and employed without departing from the spirit of my invention, which in this particular rests in the combination, with the said rolls, of some suitable means for driving them at the proper time, and which may be brought into play at the will of one of the operatives standing at the front of the machine; and it will be also understood that, in lieu of the precise means shown for manipulating the movable stops, some other mechanism may be devised and employed which can be conveniently thrown into and out of operation by one of the operatives at the front of the machine, and that, if deemed expedient, the devices employed for manipulating or operating the movable stops, and thus for throwing into and out of gear the driving mechanism of the rolls D, may be separated and placed under the control separately of the two operators, in lieu of having the combined arrangement which I have shown, although I deem the plan I have shown the preferable one.

Having now so fully shown and described my invention in trimmers that those skilled in the construction and use of such machines can readily make and apply my improvements, either in the precise forms shown or in some other forms, what I claim as new, and desire to secure by Letters Patent, is—

1. In a lumber-trimmer, the combination, with the usual carrier device or mechanism for conveying the board sidewise to the trimming-saws, and with the usual stop or stops for gaging or predetermining the length of the trimmed board, of suitable feed-rolls, D, operating, as specified, to feed the board endwise toward and against the stop device, all substantially in the manner hereinbefore set forth.

2. In a lumber-trimmer, the combination, with the feed-rolls D, which operate to feed the board endwise, as specified, the usual carrier device or mechanism for feeding the board sidewise to the trimming-saws, the usual stop or stops for gaging or predetermining the length of the trimmed board, and the driving mechanism for rotating the feed-rolls D, of a shipper-bar for throwing said driving mechanism into and out of gear, and having its free end located or arranged within easy reach of one of the operatives who has to stand at the front of the machine to feed the lumber to the carrier device, the whole constructed and operating together substantially as and for the purposes set forth.

3. In a lumber-trimmer, the combination, with the series of stops and the feed rolls D, which operate, as specified, to feed the board endwise toward and against the said stops, of mechanism, substantially such as described, which operates to throw the said feed-rolls and also the said stops into and out of operation at the pleasure of one of the operatives of the machine, all substantially in the manner hereinbefore set forth.

In witness whereof I have hereunto set my hand this 6th day of September, 1887.

MICHAEL GARLAND.

In presence of—
A. L. STEWART,
W. J. MCCORMICK.